(12) United States Patent
Ringer

(10) Patent No.: US 8,464,745 B1
(45) Date of Patent: Jun. 18, 2013

(54) CONSTANT VOLUME PRESSURE COMPENSATOR

(75) Inventor: Charles Ringer, San Diego, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 353 days.

(21) Appl. No.: 12/917,594

(22) Filed: Nov. 2, 2010

(51) Int. Cl.
*F16K 17/36* (2006.01)

(52) U.S. Cl.
USPC ........... 137/81.2; 405/193; 166/356; 114/312

(58) Field of Classification Search
USPC ........... 137/81.2; 114/312; 166/356; 405/193
See application file for complete search history.

(56) References Cited

U.S. PATENT DOCUMENTS

| | | | | |
|---|---|---|---|---|
| 3,112,724 A | * | 12/1963 | Rosen | 114/331 |
| 3,387,580 A | * | 6/1968 | Walker | 114/313 |
| 3,759,605 A | * | 9/1973 | Johnson | 359/667 |
| 4,187,796 A | * | 2/1980 | Ess | 114/312 |
| 4,226,257 A | * | 10/1980 | Trinkwalder | 137/81.2 |
| 4,771,320 A | | 9/1988 | Gell | |
| 4,903,628 A | * | 2/1990 | Lansford | 114/312 |
| 4,947,783 A | | 8/1990 | Gell, Jr. | |
| 5,368,022 A | * | 11/1994 | Wagner | 128/205.24 |
| 6,273,019 B1 | * | 8/2001 | Ciamillo, II | 114/312 |

OTHER PUBLICATIONS

Dr. Richard A Wilson et al., Development and Experience of a Practical, Pressure-Tolerant, Lithium Battery for Underwater Use, Oceans 06, 2006, all, United States.
Karstein Vestgard et al., HUGIN 3000 AUV for Deepwater Surveying, Offshore Tech Conference, May 1, 2000, all, United States.

* cited by examiner

*Primary Examiner* — John K Fristoe, Jr.
*Assistant Examiner* — Matthew W Jellett
(74) *Attorney, Agent, or Firm* — Arthur K. Samora; Kyle Eppele

(57) ABSTRACT

A pressure equalizer for an underwater vessel can include a pneumatic reservoir and a pressure compensating valve (PCV). The PCV can be in fluid communication with the surrounding underwater environment and the vessel interior, and in selective fluid communication with the reservoir. The PCV can further include a valve body and a valve plug. As the PCV opens, the plug moves within the body to establish a path of fluid communication from the reservoir, through the PCV to the vessel interior, to allow flow of high pressure compressible fluid from the reservoir into the interior to pressurize the vessel interior. As the vessel interior pressure equalizes with the surrounding environment, the plug moves within the body to close the fluid communication path with the reservoir, thereby stopping the flow of compressible fluid into the vessel interior to maintain the equalized pressure.

13 Claims, 5 Drawing Sheets

CONSTANT VOLUME PRESSURE COMPENSATOR

FEDERALLY-SPONSORED RESEARCH AND DEVELOPMENT

This invention (Navy Case No. 100323) is assigned to the United States Government and is available for licensing for commercial purposes. Licensing and technical inquires may be directed to the Office of Research and Technical Applications, Space and Naval Warfare Systems Center, Pacific, Code 72120, San Diego, Calif. 92152; voice (619) 553-2778; email T2@spawar.navy.mil.

FIELD OF THE INVENTION

The present invention pertains generally to pressure compensating systems. More particularly, the present invention pertains to an underwater pressure compensating system that uses a pneumatic reservoir to equalize and maintain the pressure between the interior of an underwater system and its surrounding environment with a minimum of moving parts.

BACKGROUND OF THE INVENTION

Autonomous vehicles are being increasingly used for a variety of underwater applications. Some applications include gathering undersea data pertaining to seafloor mapping, and gathering data for chemical analysis for possible oil field exploration, with an increasing trend towards deep water field developments. The data gathering can be important, particularly in the case of deep water development for oil fields, because there is a much greater potential for larger finds than can be expected in more littoral regions. But to gather data, these autonomous vehicles will often contain components that cannot withstand a large pressure differential, such as onboard electronics, for example. Accordingly, these deep water vehicles will often employ a pressure compensation system for either an electrical subsystem such as a battery, or the complete electrical system, such as in the case of the Navy Advanced Tethered Vehicle. Other deep diving autonomous vehicles have components that must kept dry, in addition to being pressure sensitive. One way to accomplish this is to develop deep diving vehicles where the entire sensor and electrical package is kept dry by enclosing the package within a pressure vessel, which is itself pressure compensated.

However, the use of pressure vessels in the traditional way to protect electronic equipment from the undersea environment has its own costs. As pressures increase due to the deeper depths desired for exploration, the size, weight, and cost of pressure vessels required to house the selected vessel components increases as well, and the increase is exponential. One example of this is the comparison between the REMUS 100 and REMUS 6000 autonomous vehicles manufactured by Hydroid®. Both vehicles utilize the same electronics and software. However, to accommodate an increase in depth range from one hundred meters to six thousand meters (100 m to 6000 m), the vessel weight increases from eighty pounds to approximately two thousand pounds (80 lbs to 1950 lbs) to accommodate the stronger pressure vessels needed. Alternately, a combination of exotic material and heavy walled pressure vessels are used. But in addition to being heavy, the exotic materials used to manufacture such pressure vessels add a great deal of cost, which restricts their utility.

Still other pressure compensation systems use an inert, non-compressible fluid such as mineral oil, contained in a compressible volume pressure compensation system to protect batteries and electronics from the undersea environment. The advantage of using a liquid is that, there is little volume change as pressure increases. This allows for more compact system designs. Incompressible fluid filled systems are however heavy, require that additional buoyancy be added to the system to offset the mass of the fluid filled vessels in order to maintain neutral buoyancy. This added buoyancy is typically provided by using large quantities of materials which are less dense than water such as ceramic spheres, syntactic foam, or ultra high molecular weight polyethelene. While the added bulk from flotation is not always a drawback, such as in moored instruments, it is in the case of autonomous underwater vehicles that are mobile, where the added weight and bulk increases drag and energy expenditures, resulting in lower endurance.

In view of the above, it is an object of the present invention to provide a pressure compensating system that equalizes the pressure between the interior of a vessel and the surrounding underwater environment. Another object of the present invention is to provide a pressure compensating system that uses a compressible fluid to equalize pressure between the vessel interior and the surrounding environment. Yet another object of the present invention is to provide a pressure compensating system that uses pressure rather than volume for pressure equalization, to allow for a maximum packing efficiency of electronics, as significantly less vessel volume must be allocated for pressure equalization. Another object of the present invention is to provide a pressure equalizing system that equalizes pressure between the vessel interior and the surrounding environment as the system descends to its operating depth without requiring the use of exotic ceramic materials for the system components. Yet another object of the present invention is to provide a pressure compensating system for a vessel that uses a balance of forces to prevent implosion of the pressure vessel instead or a complicated arrangement of pressure seals. Yet another object of the present invention is to provide a pressure compensating system for a vessel that can actively reduce the pressure inside of the vessel to prevent explosion of the vessel as ambient pressure decreases. Still another object of the present invention is to provide a pressure compensating system that is easy to manufacture in a cost-efficient manner.

SUMMARY OF THE INVENTION

A pressure equalizer for an underwater vessel, and methods for manufacture and use therefor, can include a pneumatic reservoir and a pressure compensating valve (PCV). The PCV can also be in fluid communication with the surrounding underwater environment, as well as with the vessel interior. The reservoir and PCV can be in selective fluid communication with each other. In some embodiments, the PCV and reservoir can be located within the vessel interior. In other embodiments, the PCV and reservoir can be external to the vessel.

The PCV can further include a valve body and a valve plug. The valve body can be formed with an interior orifice, a pneumatic inlet orifice, a backflow orifice and an environment orifice. The valve plug can be positioned within the valve body, and the valve plug can be formed with a longitudinal conduit that extends from the end of the plug closest to the interior orifice partially into the plug. The longitudinal conduit can merge into at least one transverse duct that extends completely across the body and that is in fluid communication with said conduit. A spring or similar type of resilient member can be positioned between the plug and the portion of the valve body that is proximate the interior orifice.

The PCV can alternately move between an open position and a closed position to equalize pressure between the vessel interior and the surrounding underwater environments. In the open position the surrounding underwater pressure is greater than the pressure in the vessel interior plus the compressive force of the spring, and the spring can be fully compressed. This moves the plug towards the end of the valve body having the interior orifice, which establishes a path of fluid communication from the reservoir, through the pneumatic inlet orifice, into the duct, through the conduit and the interior orifice, and into the vessel interior. This allows flow of a high pressure gas into the interior to pressurize the vessel interior.

Once the pressure in the vessel interior plus the force of the spring is approximately equal to the pressure of the surrounding underwater environment, the PCV closes. In the closed position, the spring is relaxed, which moves the plug away from the interior orifice. This establishes a path of fluid communication from the vessel interior and through the interior orifice, through the conduit and duct, and out of the valve body through the backflow orifice. At the same time, the aforementioned path of fluid communication from the reservoir into the vessel interior becomes closed. While the PCV is in the closed configuration, high pressure gas cannot flow into the vessel interior due to the pneumatic inlet orifice being isolated between two seals. Furthermore, the PCV is stable in this configuration due to the balance of opposing forces on the seals which isolate the pneumatic inlet orifice. The system can further include backflow piping and backflow check valves. The backflow piping establishes a path of fluid from communication from backflow orifice to the external environment, while the check valves prevent water from flowing in the opposite direction, from the environment into the PCV valve body. With this configuration, compressible gas from the vessel interior can bleed (flow) out of the vessel interior, out of the backflow orifice through the backflow piping and out of the system when the vessel interior pressure is greater than the ambient underwater pressure. This arrangement effectively prevents over-pressurization of the vessel interior and maintains an equal pressure between the vessel interior and the surrounding underwater environment as the vessel and system surface.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

Figure 1:
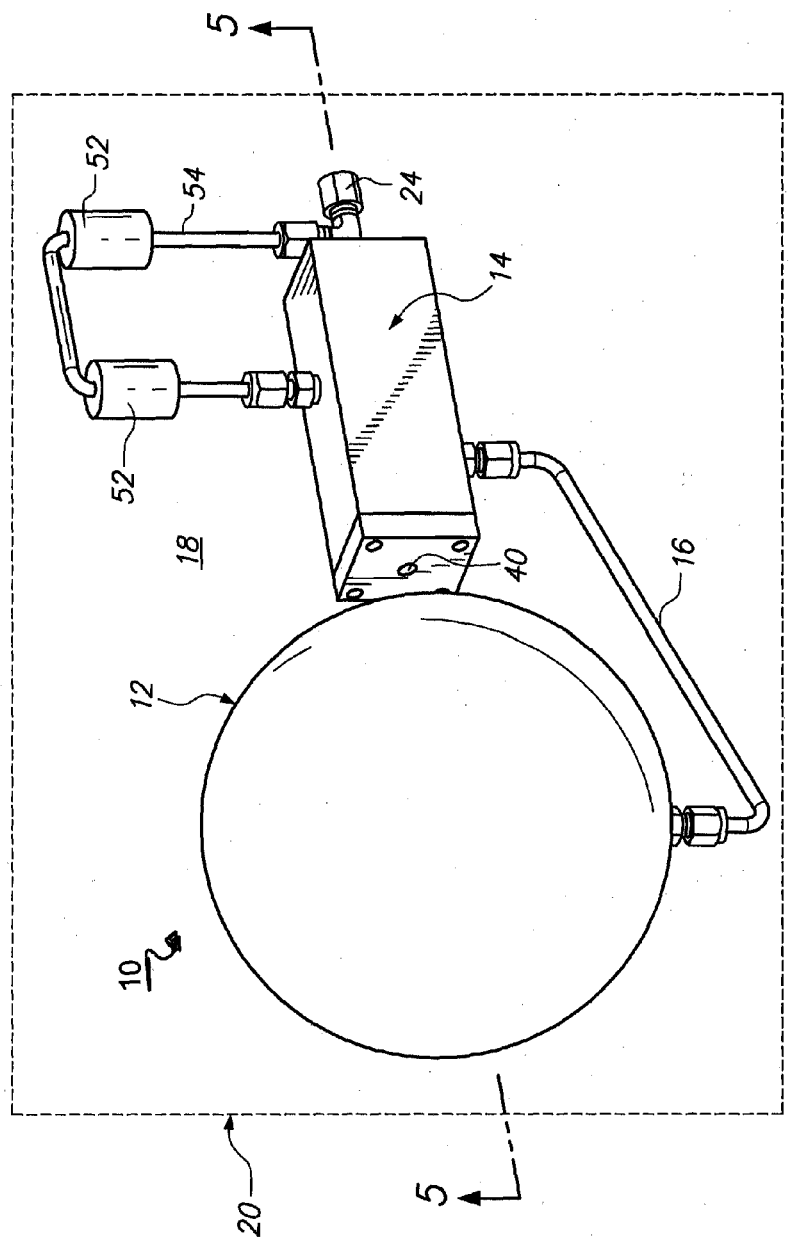
FIG. 1 is a side elevational view of the pressure equalizer according to several embodiments of the present invention.
Figure 2:
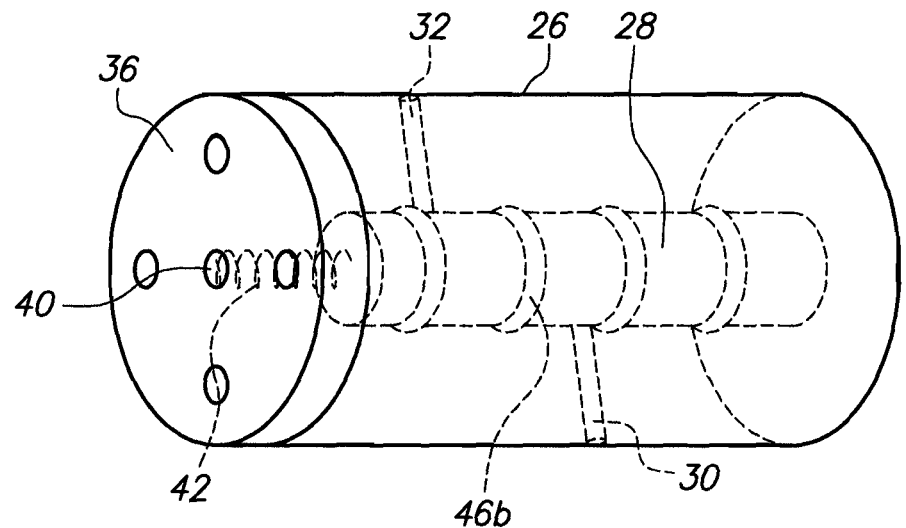
FIG. 2 is side elevational view of an alternative embodiment of the pressure compensating valve (PCV) for the equalizer of FIG. 1, with the PCV plug shown in phantom.

Referring initially to FIGS. 1 and 2, a pressure compensating system in accordance with several embodiments of the present invention can be shown and generally designated by reference character 10. As shown, system 10 can include a high pressure reservoir 12 that is connected with a pressure compensating valve (PCV) 14 via piping 16. PCV 14 can be positioned within the interior 18 of underwater vessel 20 (shown in phantom in FIG. 1) so that it can be in fluid communication with interior 18 via interior orifice 40, and the PCV can be in fluid communication with the surrounding underwater environment via environment orifice 34 (environment orifice 34 can be seen in FIG. 3) and fitting 24. The system 10 uses air or other similar type of compressible fluid at a high pressure and at a controlled rate from reservoir 12 to dispense air or other similar type of compressible fluid at a controlled rate into the vessel 20. The amount of air/compressible fluid to be dispensed can be controlled through comparison of the surrounding ambient environment pressure through fitting 24, with the pressure in interior 18 of vessel 20, as described more fully below.

Reservoir 12 can be made of any lightweight rigid material that can maintain its shape at increased water depths. Reservoir 12 in FIG. 1 is shown with a spherical shape and can be formed with a rigid material, which establishes a constant volume of compressible fluid for operation of system 10. It should be appreciated that reservoir 12 could be formed with any shape that is convenient to the user, such as cylindrical, cubic, and the like. Similarly, PCV 14 could be made of various materials and shaped according to the user's needs; for example, PCV could have a substantially cylindrical shape, as shown in FIG. 2. It should also be appreciated that the system 10 could also be located outside of vessel 20 and connected to vessel 20. In these embodiments, the PCV would be in fluid communication with the surrounding underwater environment via orifice 40, and in fluid communication with interior 18 via orifice 34.

Figure 4:
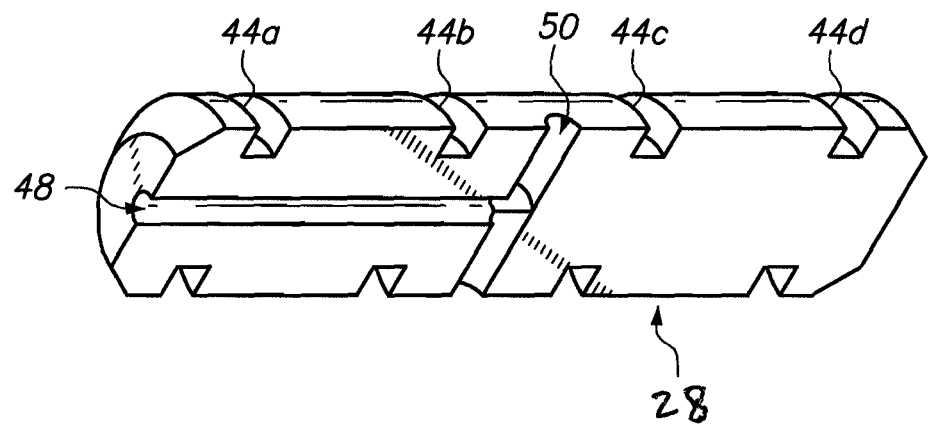
FIG. 4 is a cross-sectional view of the plug for the PCV taken along line 4-4 in FIG. 3.
Figure 3:
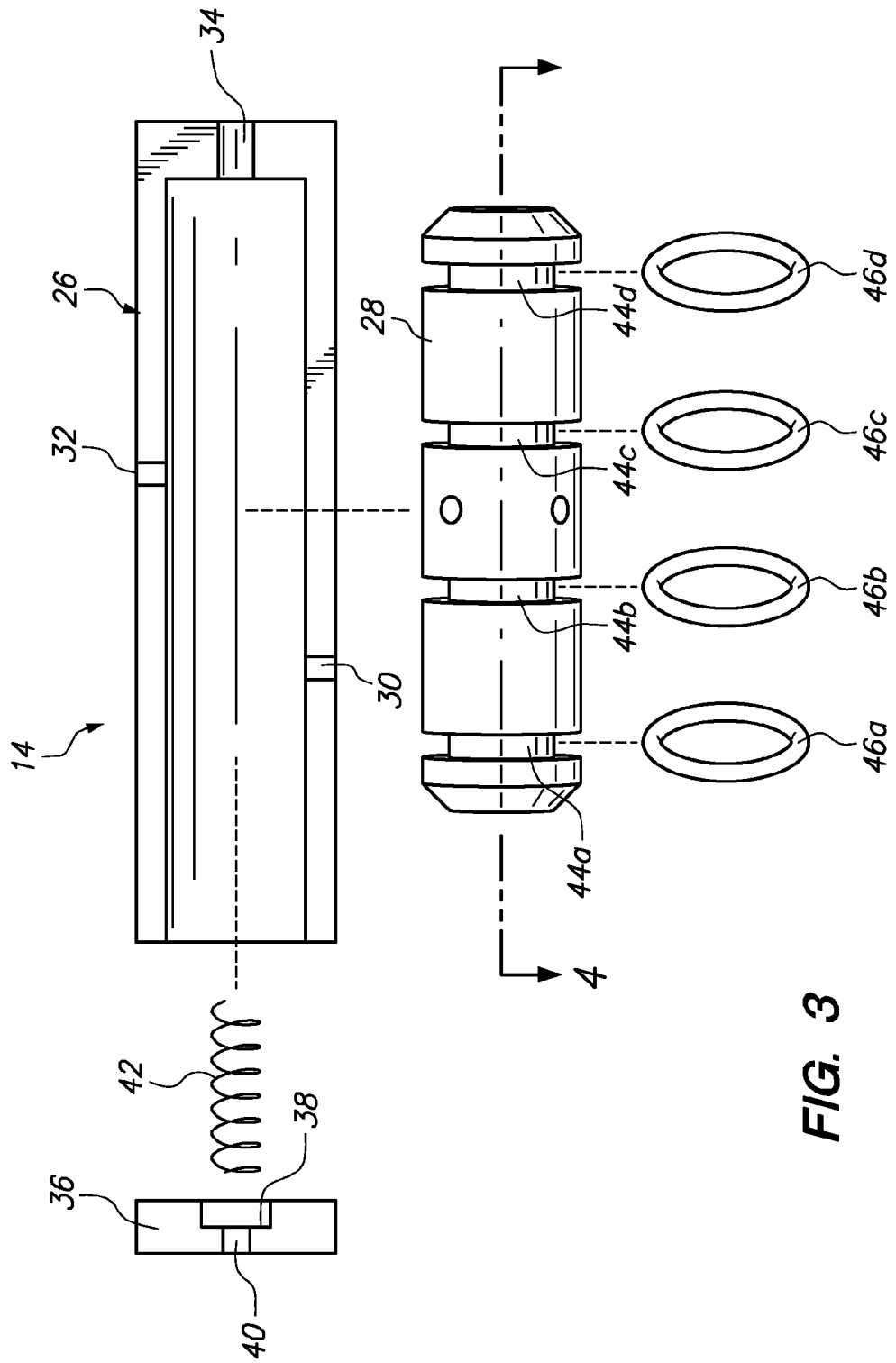
FIG. 3 is an exploded side elevational view of the PCV of the equalizer of FIG. 1, with portions of the valve body removed for clarity.

Referring now to FIGS. 2-4, the structure of the PCV 14 is shown in greater detail. PCV can include a valve body 26 and a valve plug 28 that can be slidably positioned within the valve body 26. Valve body 26 can be formed with a pneumatic inlet orifice 30, a backflow orifice 32 and an environment orifice 34. Environment orifice 34 provides a path for fluid communication with surrounding underwater environment. PCV 14 also included an end cap 36 that can be formed with a seat 38 that merges into an interior orifice 40. A spring 42 or similar type of resilient member can be positioned with one end of spring 42 in seat 38 and the other end contacting valve plug 28.

Plug 28 includes a plurality of grooves 44 (grooves 44a-d are shown in FIGS. 3 and 4) and a plurality of seals 46a-d can be correspondingly placed in grooves 44a-d. The materials and structure of the seals 46 (as well as the machined tolerances between body 26 and plug 28) can be chosen according to the desired application of the system 10. In some deep-water, high-pressure embodiments, seals 46 can be high pressure seals. For lower pressure applications, a lower quality, more inexpensive seals of different can be used. As shown in FIGS. 3 and 4, plug 28 can also be formed with a conduit 48 that extends longitudinally from one end partially into plug 28. Longitudinal conduit 48 merges into a transverse duct 50 that can be formed in plug 28. Duct 50 can extend radially completely across plug 28. Conduit 48 and duct 50 can cooperate with orifices 30, 32, 34 and 40 to form selective paths of fluid communication through PCV 14 in a manner more fully described below.

Figure 5:
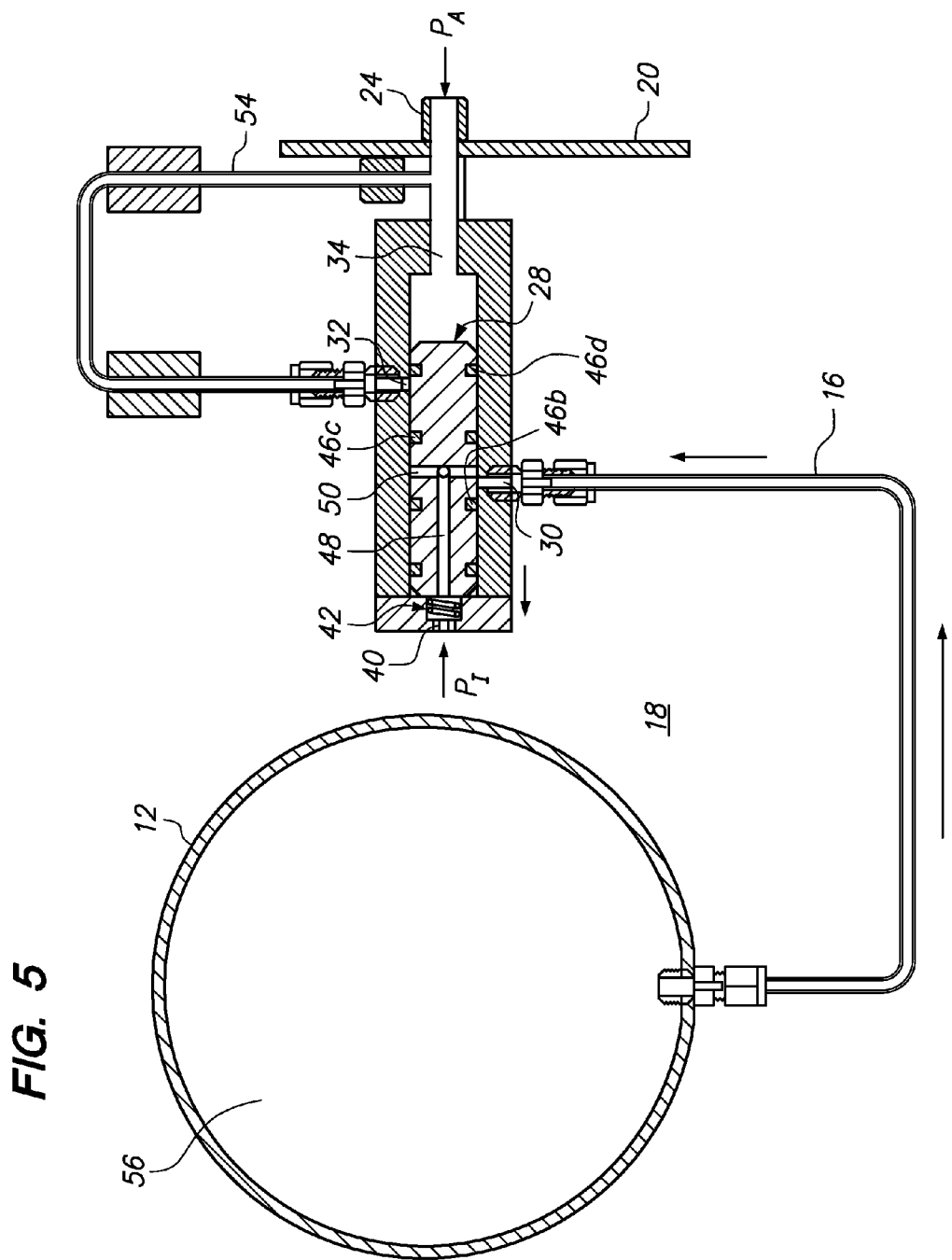
FIG. 5 is a cross-sectional view taken along line 5-5 in FIG. 1, with the PCV in an open position; and, FIG. 6 is the same view as FIG. 5, but with the PCV in an open position.
Figure 6:
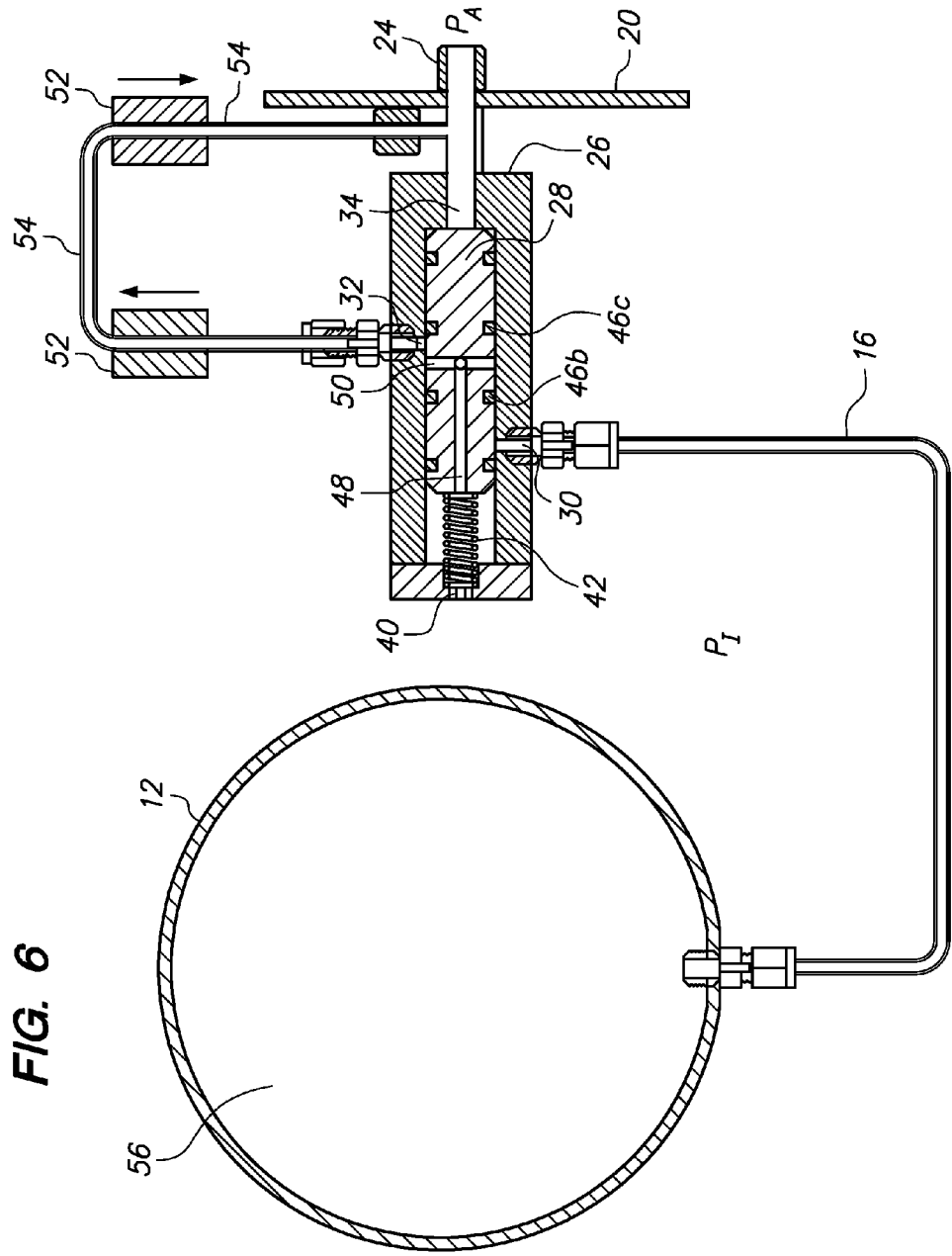

Referring now to FIGS. 5-6, the operation of the pressuring compensating system 10 is shown in greater detail. FIG. 5 depicts a condition in which the pressure $P_I$ inside the vessel 20 acting on plug 28, combined with the force of spring 42 ($F_{SPRING}$) acting on plug 28, is less than the ambient undersea pressure $P_A$ outside of vessel 20, which is acting on plug 28 in the opposite direction of $P_I$ and $F_{SPRING}$. More specifically, water from the surrounding underwater environment enters PCV 14 through environment orifice 34 and pushes against plug 28 (seal 46d prevents intrusion of water past plug 28). Similarly, the fluid (air, water, etc.) from the interior 18 of vessel 20 enters PCV 14 through interior orifice 40 and pushes against the end of valve plug 28 proximate end cap 36. Because $P_A > (P_I + F_{SPRING})$ as described above, spring 42 compresses. As spring 42 compresses, plug 28 moves toward end cap 36 until it contacts end cap. The movement of plug 28 in this manner aligns pneumatic orifice 30 between seals 46b and 46c. As pneumatic orifice becomes aligned between seals 46b and 46c, a path of fluid communication becomes established from reservoir 12, through piping 16, inlet orifice 30, duct 50, conduit 48, interior orifice 40 and into interior 18. This allows flow of high pressure compressible fluid from constant volume 56 of reservoir 12 into interior 18 of vessel 20. Compressible fluid continues to flow into interior 18 until the interior pressure begins to equalize with the surrounding underwater pressure at the vessel 20 and system 10 depth.

FIG. 6 depicts the PCS in the condition in which the pressure on the inside of the system combined with the spring force acting on by plug 28 is greater than the ambient undersea pressure acting on plug 28 in the opposite direction ($P_I + F_{SPRING}) > P_A$. Once this occurs, spring 42 will begin to relax. The PCV plug 28 begins to move away from end cap 36 into its normally closed position, as depicted in FIG. 6. Once the valve is in its normally closed position, the reservoir 12 becomes disconnected from interior 18, because pneumatic orifice 30 becomes closed off from duct 50 and from vessel interior 18 by seals 46a and 46b.

Additionally, when PCV 14 is shut, a backflow path of communication can be established. More specifically, a path of fluid communication can be established from interior 18 through interior orifice 40, longitudinal conduit 48 and transverse duct 50. As compressible gas exits duct 50, seals 46b and 46c establish a seal on both sides of backflow orifice 32 and prevent compressible fluid from leaving valve body other than through backflow orifice 32. As compressible gas exits backflow orifice 32, it passes through check valves 52 (which prevent flow in seawater into PCV 14) and backflow piping 54 and exits the system through fitting 24, as shown in FIG. 6. In this manner, system 10 allows the interior of the undersea vessel 20 can be coupled to the ambient environment to discharge excess compressible fluid, which decompresses vessel 20 and system 10 if the operator raises vessel 20 and system 10 to the water surface.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of any ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A pressure equalizer for an underwater vessel having an interior, said equalizer comprising:
    a pneumatic reservoir;
    a pressure compensating valve (PCV);
    said PCV further comprising a valve body having an interior orifice, a pneumatic inlet orifice, a backflow orifice and an environment orifice, a valve plug having a substantially uniform cylindrical surface positioned within said valve body with no substantial gap between the valve body and the cylindrical surface, said valve plug being formed with a longitudinal conduit and at least one transverse duct in fluid communication with said conduit; and,
    said PCV being adapted to establish a path of fluid communication from said reservoir through said valve plug and into said interior while said valve plug isolates a fluid path from an environment from said interior, said PCV further being adapted to establish a path of fluid communication from the environment through said valve plug and into said interior while said valve plug isolates said environment from said reservoir.

2. The equalizer of claim 1 wherein said reservoir and said PCV are located within said interior.

3. The equalizer of claim 1 wherein said reservoir and said PCV are located external to said interior.

4. The equalizer of claim 1 further comprising a spring positioned between said plug and a portion of said valve body proximate said interior orifice.

5. The equalizer of claim 1 further comprising
    a fitting fastened to said valve body, said fitting having an opening in fluid communication with said environment orifice; and,
    backflow piping fastened to said valve body to establish a path of fluid communication from said backflow orifice, through said backflow piping and said fitting opening and into said environment.

6. The equalizer of claim 1, wherein said reservoir is made of a rigid material and has a constant volume.

7. A method for equalizing pressure between an interior of an underwater system and the surrounding underwater environment, said method comprising the steps of:
   A) providing a pneumatic reservoir containing a high pressure compressible fluid;
   B) connecting a pressure compensating valve (PCV) in fluid communication with said vessel interior and said environment; said PCV comprising a valve body having a interior orifice, a pneumatic inlet orifice, a backflow orifice and an environment orifice, and a valve plug having a substantially uniform cylindrical surface slidably positioned within said valve body with no substantial gap between the valve body and the cylindrical surface, said valve plug being formed with a longitudinal conduit and at least one transverse duct in fluid communication with said conduit;
   C) establishing a path of fluid communication from said reservoir through said valve plug and into said interior while said valve plug isolates a fluid path from said environment to said interior; and,
   D) establishing a path of fluid communication from the surrounding underwater environment through said valve plug and into said interior while said valve plug isolates said underwater environment from said reservoir.

8. The method of claim 7 wherein said step C) is accomplished with said reservoir and said PCV being located within said interior.

9. The method of claim 7 wherein said step C) is accomplished with said reservoir and said PCV being located external to said interior.

10. The method of claim 7 wherein said PCV further comprises a spring positioned between said plug and the portion of said valve body proximate said interior orifice.

11. The method of claim 7 wherein said step C) is accomplished by compressing said spring to align said pneumatic inlet orifice with said transverse duct, thereby
   establishing a path of fluid communication from said reservoir through said pneumatic inlet orifice, said transverse duct, said conduit, said interior orifice and into said interior to allow flow of said high pressure compressible fluid into said vessel interior.

12. The method of claim 11 wherein said step D) is accomplished by relaxing said spring to align said backflow orifice with said transverse duct,
   to establish a path of fluid communication from interior through said interior orifice, said conduit, said transverse duct, and said backflow orifice.

13. The method of claim 12 further comprising the steps of:
   E) fixing backflow piping to said valve body to establish a path of fluid communication from said backflow orifice, through said backflow piping and from said environment orifice through said backflow piping to said environment to allow flow of said high pressure compressible fluid from said vessel interior to said environment.

* * * * *